Nov. 9, 1926.  
S. I. MERRILL ET AL  
HAY PRESS  
Filed June 19, 1924    5 Sheets-Sheet 3  
1,606,655

Inventors:  
S. I. Merrill  
C. A. Merrill.  
by Hazard and Miller  
Attorneys.

Nov. 9, 1926.
S. I. MERRILL ET AL
HAY PRESS
Filed June 19, 1924
1,606,655
5 Sheets-Sheet 4
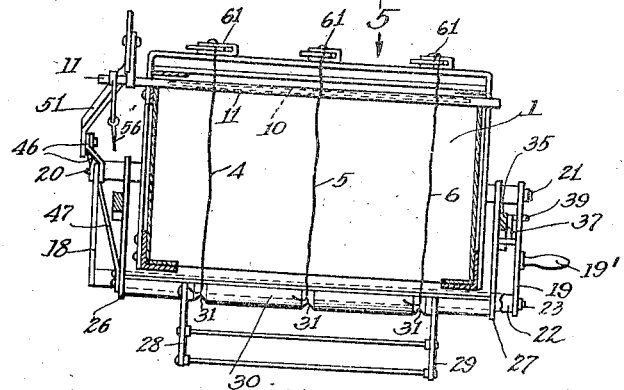
Fig. 4.
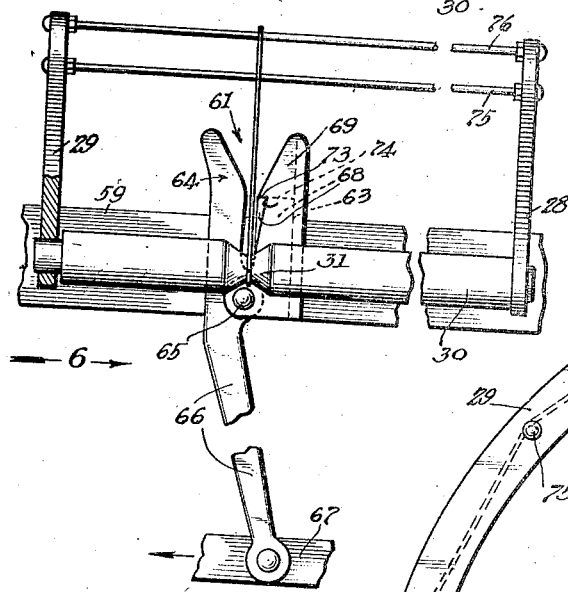
Fig. 5.
Fig. 6.
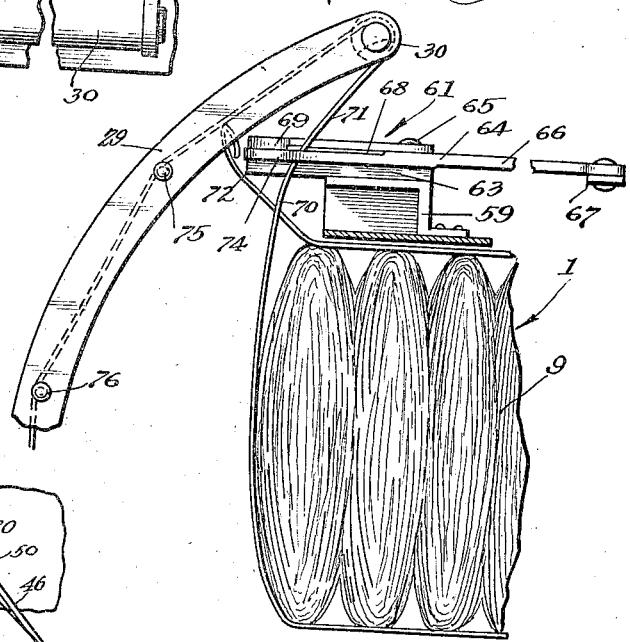
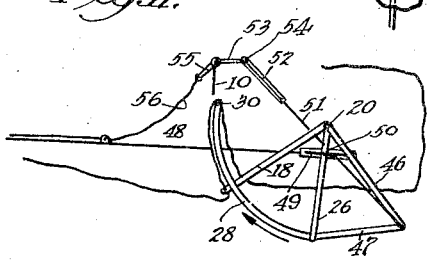
Fig. 11.
Inventors
S. I. Merrill,
C. A. Merrill.
by Hazard and Miller
Attorneys Nov. 9, 1926.                                            1,606,655
S. I. MERRILL ET AL
HAY PRESS
Filed June 19, 1924          5 Sheets-Sheet 5
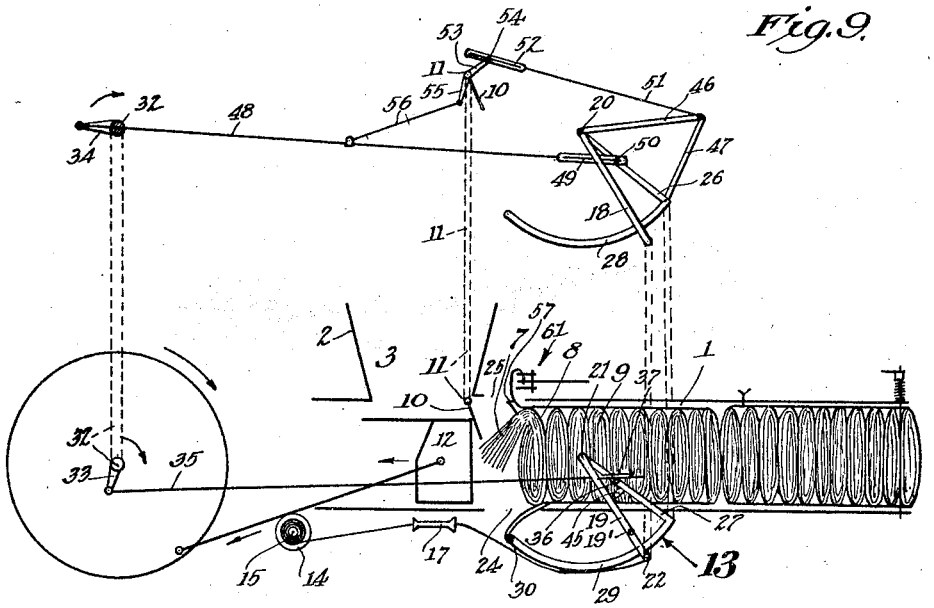
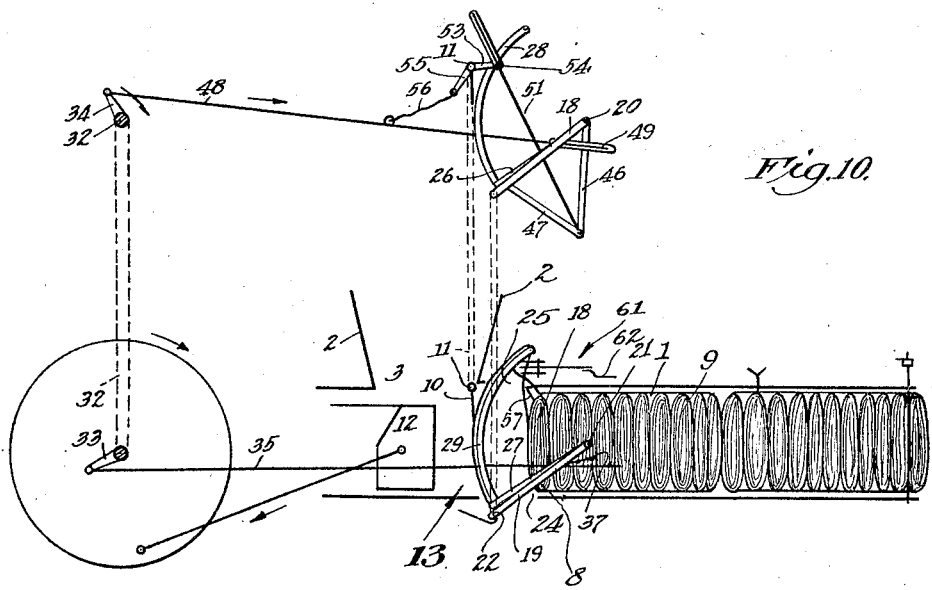
Inventors:
S. I. Merrill,
C. A. Merrill,
by Hazard and Miller
Attorneys Patented Nov. 9, 1926.

1,606,655

UNITED STATES PATENT OFFICE.

SAMUEL I. MERRILL AND CHARLES ARTHUR MERRILL, OF LOS ANGELES, CALIFORNIA.

HAY PRESS.

Application filed June 19, 1924. Serial No. 720,913.

This invention relates to hay presses, and consists of the novel features herein shown, described and claimed.

An object is to make a hay press in which the bale chamber in the press is widest horizontally instead of vertically, and to provide means for threading the baling wires around the bale in vertical planes.

Another object is to make a new type of wire threader for hay presses.

Another object is to make a hay press having wire threaders adapted to operate in vertical planes.

Another object is to make a hay press having an improved tucker for turning down the ragged edge at the upper side of the last charge of hay in a bale.

Another object is to make a hay press having wire threaders and adapted to make bales of hay with their widest dimensions horizontal so as to make it possible to make a larger entrance for the loose hay.

Other objects and advantages will appear from the drawings and specification.

The drawings illustrate a hay press having vertical threaders and a tucker in accordance with the principles of the invention.

Fig. 4 is a vertical cross section on the lines 4—4 of Figs. 1, 2 and 3, and looking in the direction indicated by the arrows.

Fig. 5 is a diagrammatic plan of the threader and wire cutter as seen looking in the direction indicated by the arrows 5 in Figs. 2, 3, 4 and 6.

Fig. 6 is a diagrammatic fragmentary view looking in the direction indicated by the arrow 6 in Fig. 5.

Fig. 9 is a view analogous to Fig. 8, the parts being shown in the operation of producing slack wires and showing the operation of the tucker at one stroke of the baling piston before the final compression which finishes a bale.

Fig. 10 is a view, analogous to Figs. 8 and 9 and showing the operation of the needle threading the wire around a finished bale and showing the tucker moved out of the way of the needle.

Fig. 11 is a view analogous to Figs. 8, 9 and 10 and showing the operation of moving the tucker out of the way of the needle, this being a step behind the operation shown in Fig. 9 and a step ahead of the operation shown in Fig. 10.

Figure 1:
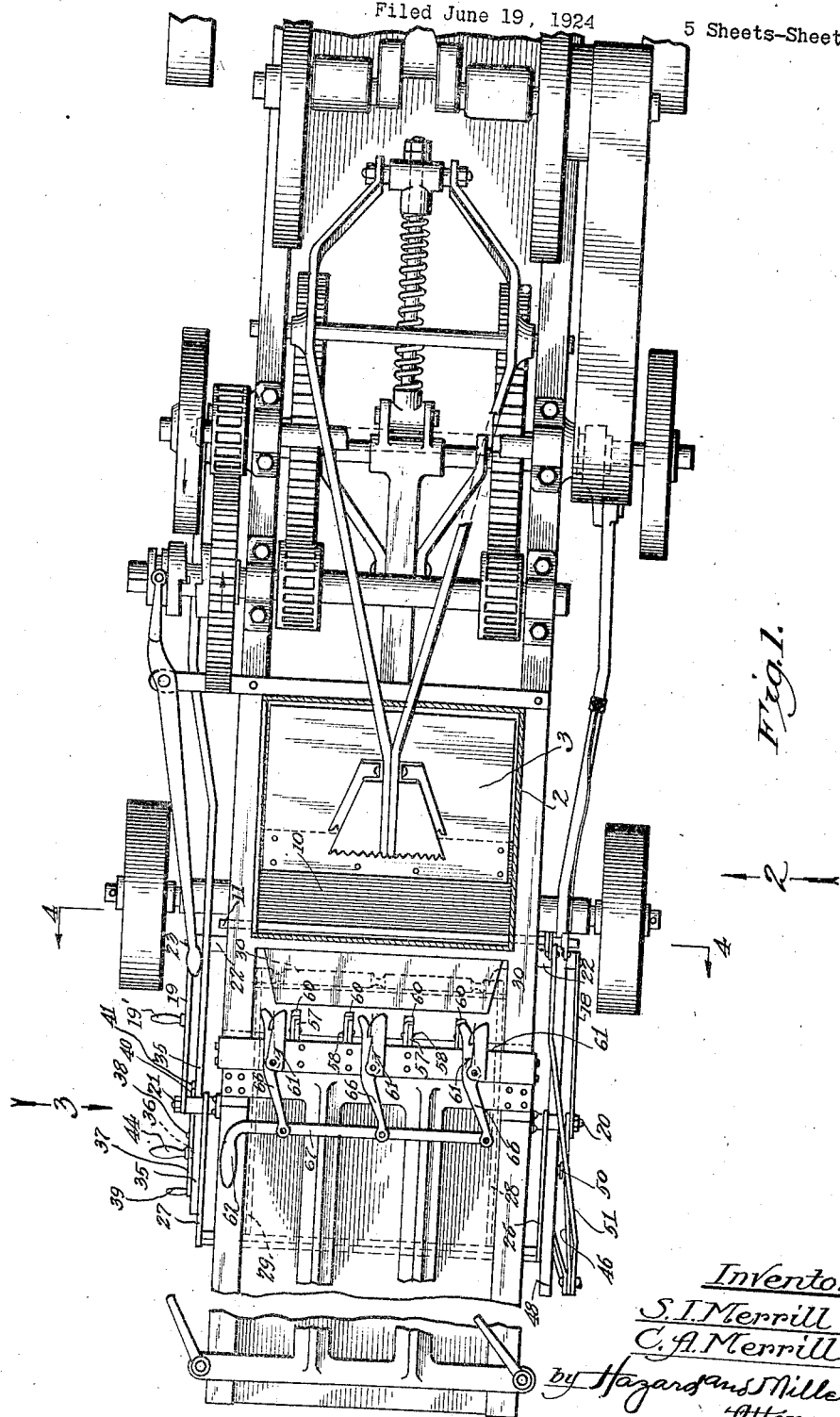
Figure 1 is a fragmentary top plan view of the complete hay press, the view being taken looking in the direction of the arrows 1 in Figs. 2 and 3.
Figure 2:
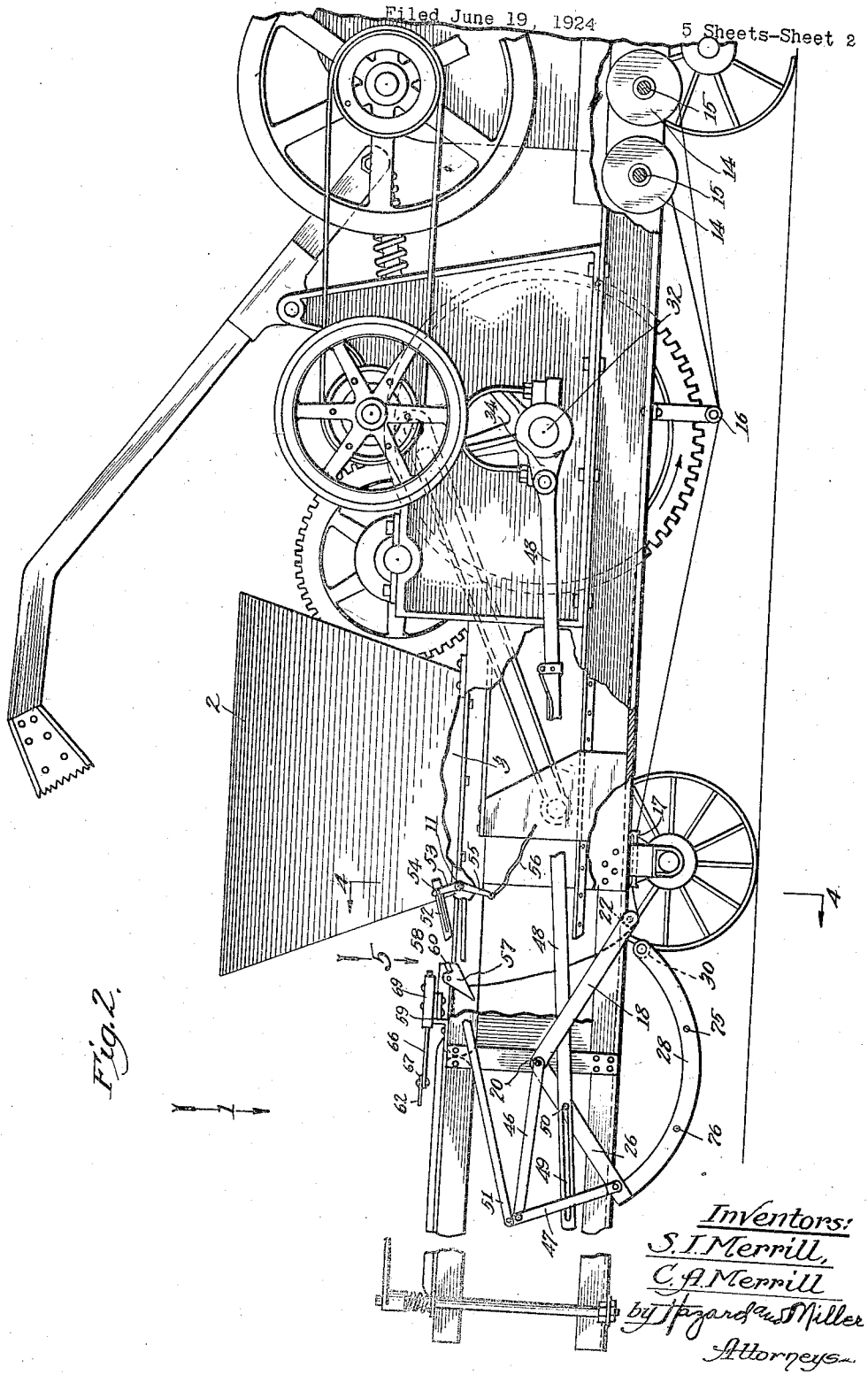
Fig. 2 is a rear elevation looking in the direction indicated by the arrow 2 in Fig. 1.

The details of construction and operation shown in the drawings are as follows:

The hay press is constructed so that the compression chamber 1 is wider horizontally than it is vertically, thereby making it possible to use a large feed hopper 2 and provide a large inlet or throat 3 for the introduction of loose hay so as to speed up the operation of making bales, and when the bales are made with their widest dimensions horizontally, it is necessary to thread the wires around the bale in vertical planes.

In order to turn the ragged edge 7 of the last charge 8 of a bale 9, in the making, downwardly and make a good finish, a tucker 10 is mounted upon a pivot 11 at the bottom of the throat 3. The tucker 10 may be about one-third as wide as the vertical thickness of a bale and the pivot 11 is at the forward edge, and the tucker is adapted to swing upwardly to a horizontal position while the bale is being formed, and then after a charge of hay 8 has been pressed against the rear end of the bale, the tucker is operated to swing downwardly, thereby pressing the ragged edge 7 downwardly and when it comes to the last charge in a bale then the next operation of the plunger 12 will press the ragged edge 7 against the charge 8 and make a round upper edge on the charge. Then the plunger 12 recedes and the wires are threaded upwardly between the charge 8 and the receded plunger 12 and during the threading operation the tucker 10 is swung downwardly and backwardly out of the way of the needle carrying the wires.

The details of the needle construction 13 for threading the wires 4, 5 and 6 around the bales 9 are as follows:

Three wire reels 14 are mounted upon a shaft 15 near the forward end of the hay press, and the wires run under guide rollers 16 and through guide tubes 17. Slack producing arms 18 and 19 are pivotally mounted upon bolts 20 and 21 fixed in the frame of the hay press, and a guide roller 22 is mounted upon a shaft 23 connecting the swinging ends of the arms 18 and 19, and the wires 4, 5 and 6 pass under the guide roller 22 and upwardly through a slot 24 formed in the bottom of the compression chamber 1 and through a slot 25 formed in the top of the compression chamber immediately behind the hopper 2. The guide roller 22 has grooves in which the wires run. A handle 19' is fixed in the arm 19 for manually operating the slack producing arms 18 and 19 carrying the roller 22.

Needle carrying arms 26 and 27 are mounted upon the bolts 20 and 21 and curved needles 28 and 29 are rigidly connected to the swinging ends of the needle arms 26 and 27 and are suitably braced crosswise, and a guide roller 30 connects the swinging ends of the arms 28 and 29 and has wide flaring grooves 31 in which the wires 4, 5 and 6 run. The radius of swing of the roller 30 is less than that of the roller 22 so that when the roller 22 swings backwardly to produce a slack, as in Fig. 9, the roller 22 will pass outside of the needle arms 28 and 29 and the wires will engage in the grooves of the roller 30, thereby producing slack in the wires to double the extent of the distance to which the roller 22 passes beyond the roller 30.

Figure 3:
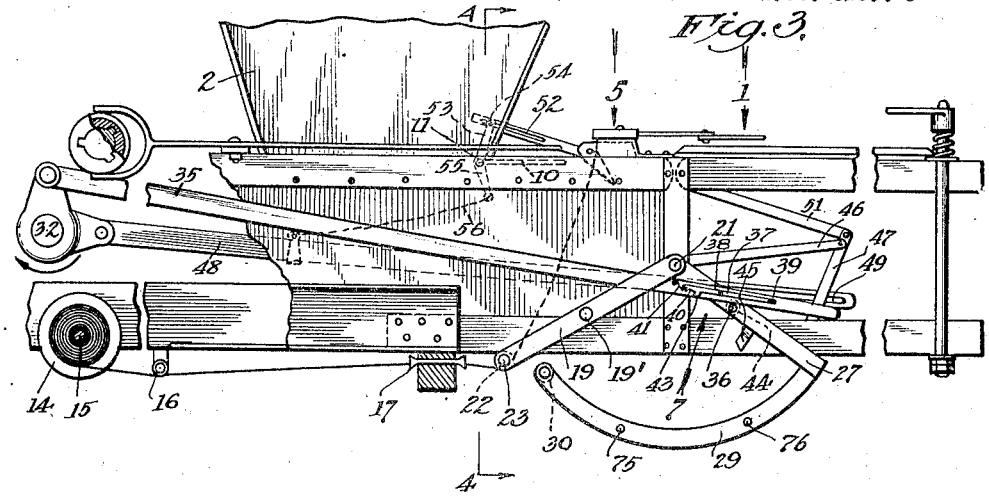
Fig. 3 is a front elevation looking in the direction indicated by the arrow 3 in Fig. 1.

The bull wheel shaft 32 has a crank 33 fixed upon one end and a crank 34 fixed upon the other end, the cranks 33 and 34 being at angles of 90° relative to each other. A connecting rod 35 is connected to the crank 33 and the free end of the connecting rod 35 rides continually upon a pin 36 fixed in the arm 27. A latch 37 is connected to the rod 35 by a pivot 38 and has a handle 39 for manual operation. A finger 40 extends from the opposite end of the latch 37 from the handle 39 and rests upon a spring 41 secured to the rod 35 by a pin 42. A dog 43 projects downwardly from the latch 37 immediately behind the finger 40 and is adapted to engage the pin 36 fixed in the arm 27. Normally the spring 41 holds the latch dog 43 out of engagement with the pin 36. When the needle is in the position shown in Figs. 3 and 8 and it is desired to thread the wires around the finished end of a bale, the operator raises the handle 39 and continued operation of the rod 35 will cause the latch dog 43 to engage the pin 36 and swing the needle arms 28 and 29 carrying the roller 30 upwardly between the bale 9 and the withdrawn plunger 12, as shown in Fig. 10.

Figure 8:
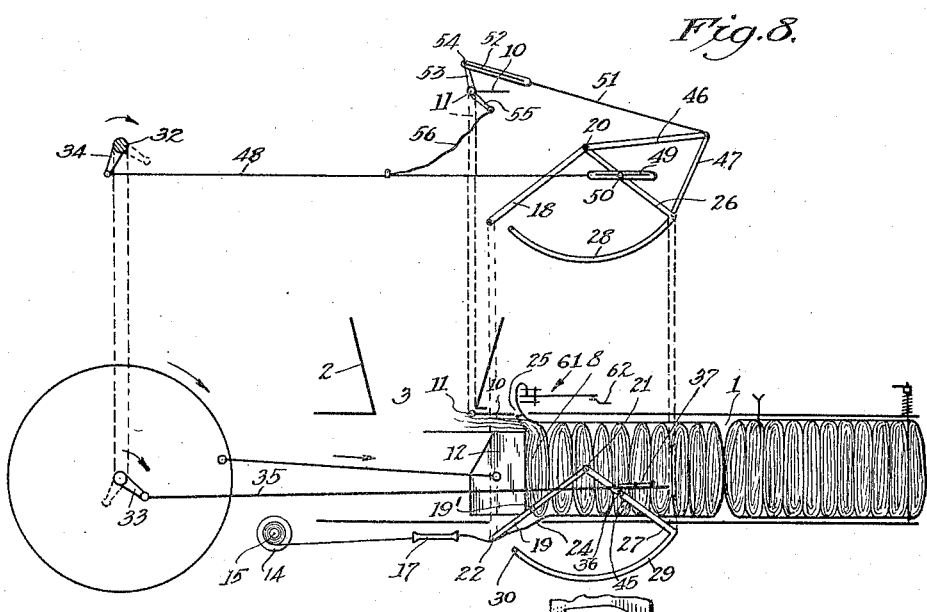
Fig. 8 is a diagrammatic view illustrating the operation of the hay press with special reference to the needle for threading the wires around the bale and showing the operation of the tucker for turning down the ragged edge of the last charge of hay in a bale, the parts being shown in the operation of making a bale.
Figure 7:
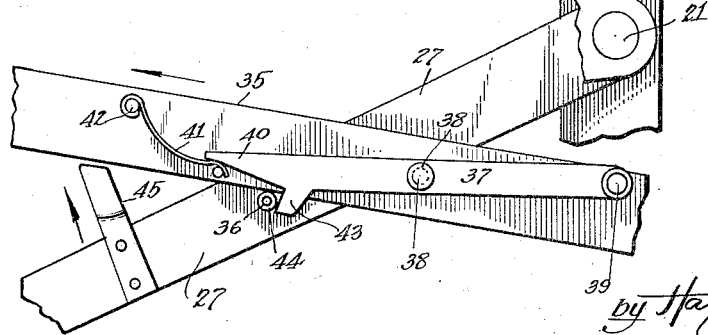
Fig. 7 is an enlarged detail view in elevation of the trip mechanism for operating the needles which thread the wires around the bale, the parts being indicated by the arrow 7 in Fig. 3.

A stop 45 is secured to the arm 27 and bent outwardly and extends upwardly to engage the rod 35 to lift the latch 43 and release the needle arms 28 and 29, as shown in Fig. 7. An arm 46 extends from the inner end of the arm 26, and a second arm 47 extends from the outer end of the arm 26, the arms 46 and 47 being connected at their outer ends. A connecting rod 48 is connected to the crank 34 and has a slot 49 in which a pin 50 operates to a limited extent, the pin 50 being fixed to the arm 26 so that as the bull wheel shaft 32 rotates to operate the crank 34, the connecting rod 48 will slide on the pin 50 in the slot 49 and as the crank 34 moves backwardly the pin 50 will reach the forward end of the slot 49, and continued operation will swing the arms 26 and 27 backwardly, thus withdrawing the needle arms 28 and 29 to their normal positions, as shown in Fig. 8.

Thus it will be seen that when a bale is to be finished the operator moves the handle 39 upwardly, thus connecting the rod 35 to the arm 27 and threading the wires upwardly, and immediately upon the next quarter turn of the bull wheel shaft 32 the crank 34 will operate the rod 48 to withdraw the needle arms 28 and 29, and the needle arms remain in their withdrawn positions until the operator again raises the handle 39. A handle 44 is fixed on the pin 36 for manual manipulation of the needle arms 28 and 29.

A connecting rod 51 is attached to the meeting ends of the arms 46 and 47 and has a slot 52. A crank 53 is fixed to the pivot 11 and has a pin 54 operating in the slot 52. When the tucker 10 is in horizontal position, as when the bale is being produced, the pin 54 operates freely in the slot 52 to allow the tucker to vibrate as the hay passes under it. The rod 51 serves to pull the tucker 10 downwardly and swing it forwardly far enough to allow the needle arms 28 and 29 to pass upwardly without colliding with the tucker 10. A second crank 55 is fixed to the pivot 11 and extends downwardly, and a cord 56 is connected to the crank 55 and to the connecting rod 48.

At each revolution of the bull wheel shaft 32 the cord 56 will be pulled to swing the tucker 10 downwardly, thereby folding the ragged edge of each charge of the bale downwardly so as to make round upper edges on the charges. During this operation the pin 54 will slide in the slot 52. A plurality of dogs 57 are mounted upon pivots 58 in bearings extending forwardly from the supporting bar 59 and the points of the dogs raise to allow the plunger and hay to pass, and then the points fall to engage the upper edge of the last charge of hay 8 so as to hold the charges upright. Stops 60 hold the dogs 57 from swinging forwardly under the tension of the rebound of the hay.

Wire cutters 61 are mounted upon the supporting bar 59, there being a complete wire cutter for each wire 4, 5 and 6, and the wire cutters are connected together by a handle 62 for simultaneous operation. Each wire cutter 61 has a rigid cutting jaw 63 mounted upon the bar 59 and a swinging cutting jaw 64 pivotally mounted relative to the jaw 63 on a hinge pin 65. An arm 66 extends from the pivoted jaw 64 and is pivotally connected to the bar 67 carrying the handle 62. A recess 68 is formed in the lower face of a rigid jaw 69 and the rigid wire holding jaw 69 is mounted above the jaw 64, which extends under the recess 68, so that when a wire carried upwardly by the roller 30 past the open ends of the jaws 63 and 64 passes between the jaws and the handle 62 is operated, the wire is cut by the jaws 63 and 64 to leave the end 70 free, and the end 71 severed from the end 70 is bent under the jaw 69 in the recess 68 and ultimately this end 71 is held while the new bale is being made, and when the bale has been finished the end 71 is released by pushing on the handle 62 and becomes the end 72 and the ends 70 and 72 are twisted together in any of the well known ways to form a bale tie for the finished bale.

The wire carried by the roller 30 in the groove 31 passes straight up and straight back, and in order to catch and hold the wire end 71 the inner edge of the jaw 69 has a shoulder 73 extending horizontally and a shoulder 74 extending downwardly and forming one end of the recess 68 so that as the wires tuck under the jaw 69 in the recess 68 and the roller 30 recedes the wire will engage the shoulder 73, and the shoulder 74 and the pinch upon the wire in the recess 68 will hold the wire while the next bale is being formed.

The needle arms 28 and 29 are concentric to the axis formed by the bolts 20 and 21 and are connected together by brace rods 75 and 76 and the brace rods 75 and 76 form guides against which the wires bear during the threading operation as shown in Fig. 6.

In our constuction of hay press as above described we utilize a compression chamber wider horizontally than vertically and thus utilize a feed hopper which may be made considerably wider than those making standard bales in accordance with the standard practice of having the bales higher than their width. For instance, a standard bale measuring 14 inches in width would be 18 inches in height and 36 inches in length and have the binding wire pass around the bale horizontally, whereas in our construction we make the same size bale by having the width 18 inches, the height 14 inches and the length 36 inches with the binding wires passing around the bale vertically. Therefore we are enabled to feed the hay through the hopper more rapidly in our type of wide press than in the standard type of narrow press.

In baling hay it is the practice to have the length of the bale twice one of the other measurements so that the bales can be stacked up properly, breaking joint.

Various changes may be made without departing from the spirit of the invention as claimed.

We claim:

1. A hay press comprising in combination a compression chamber, a hopper having a throat positioned above the chamber, a tucker plate pivotally mounted on one side of the throat with the free end of the plate extending towards the compression chamber, means to swing said tucker plate downwardly to engage the ragged edge of a charge, needle arms adapted to carry a wire vertically at the end of the bale and means operatively connected between the tucker plate and the needle arms adapted to swing the tucker plate downwardly in a vertical direction to allow passage of the needle arms.

2. A hay press comprising in combination a compression chamber, a hopper, a pivotally mounted tucker plate positioned below the hopper, extending towards the compression chamber, a bull wheel shaft, means to press hay through the hopper operatively connected to the bull wheel shaft, a crank on the bull wheel shaft, a connecting rod connected to the said crank, a cord operatively connected between the connecting rod and the tucker plate adapted to swing the said plate downwardly to turn the ragged edge of a charge, a pair of carrying arms swivelly mounted on the frame of the press and loosely connected to the said connecting rod, a pair of curved needle arms mounted thereon, a guide roller to feed wire vertically at the end of a bale, a press plunger operatively connected to the bull wheel shaft and means operatively connected to the needle carrying arms to swing the tucker plate downwardly after the compression of a bale and said means being operated by the connecting rod connected to the needle carrying arms.

3. A hay press as claimed in claim 2, having in addition a pair of slack producing arms mounted on the same pivots as the needle carrying arms, having a guide roller supported thereon, with a greater radius of swing than the guide roller on the needle carrying arms and means to swing said arms with the guide roller swinging on the outside of the curvature of the needle arms.

4. In a hay press, a compression chamber, a pressing plunger to compress hay therein, a pair of curved needle arms, a guide roller carried at the end of said arms, means to swing said arms vertically between the compressed bale and a pressing plunger, wire cutters positioned above the compression chamber, adapted to engage the wire carried by the needle arms, manually operated means to operate the said cutters, slack producing arms having a guide roller mounted on the end thereof and manual means to operate said slack producing arms with the said guide roller passing on the outside of the curvature of the needle arms, thereby producing a slack in the wire.

5. In a hay press having a compression chamber mounted within the framing of the press, a pair of needle carrying arms swivelly mounted on the frame, curved needle arms attached thereto having a guide roller on the end of said arms, a bull wheel shaft, a crank connected thereto, a connecting rod connected to said crank, a pin fixed to the needle carrying arms on which said connecting rod rides and a manually operated latch mounted on the connecting rod adapted to engage the said pin to operate the needle carrying arms to lift the wire vertically at the end of a bale.

In testimony whereof we have signed our names to this specification.

SAMUEL I. MERRILL.
CHARLES ARTHUR MERRILL.